UNITED STATES PATENT OFFICE.

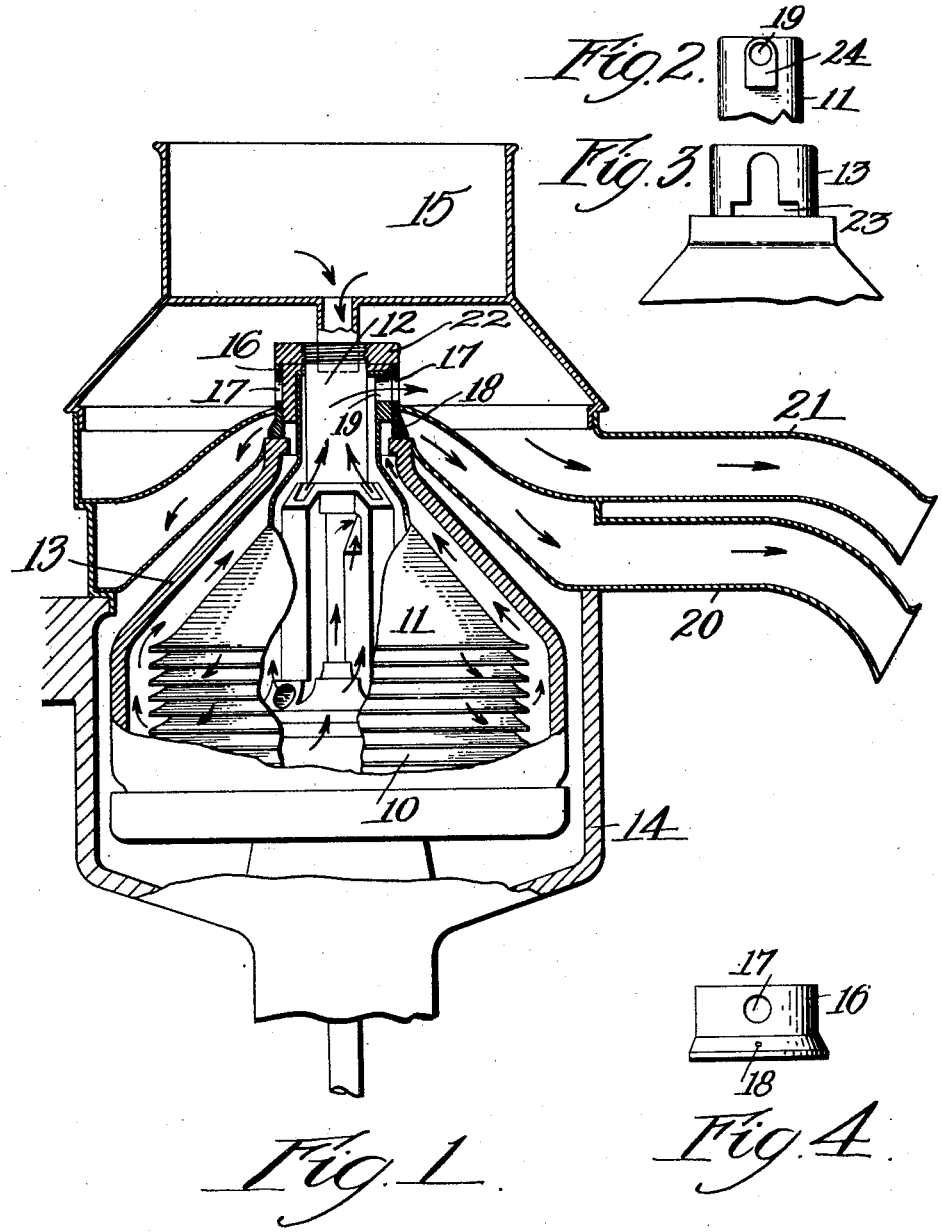

ARTHUR S. NICKERSON, OF WHITINSVILLE, MASSACHUSETTS.

DEVICE FOR ENRICHING MILK.

1,412,415.  Specification of Letters Patent.  Patented Apr. 11, 1922.

Application filed June 9, 1919. Serial No. 302,736.

*To all whom it may concern:*

Be it known that I, ARTHUR S. NICKERSON, a citizen of the United States, residing at Whitinsville, in the county of Worcester and State of Massachusetts, have invented a new and useful Device for Enriching Milk, of which the following is a specification.

As is well known the laws of some of the States require such a high fat content in milk that the pure milk as it comes from many Holstein cows does not measure up to the standard and cannot be sold without breaking the laws.

This invention is designed for the purpose of providing a method and means by which a very small proportion of the very poorest quality of milk can be removed without really separating the cream from the main body of milk; and also to provide for regulating the separation so that the machine will deliver milk of a predetermined quality; and especially to provide these improvements in such a form that they can be applied to an ordinary cream separator without dismounting any of its important parts or interfering with its construction.

Further objects and advantages will appear hereinafter.

Reference is to be had to the accompanying drawings in which—

Fig. 1 is a central sectional view of a well known type of cream separator with a preferred embodiment of this invention applied thereto;

Fig. 2 is an elevation of the upper part of the cone;

Fig. 3 is an elevation of the top of the hood, and

Fig. 4 is an elevation of the collar.

I have not shown the entire cream separator but only the parts which have to do directly with the function of separating the cream and milk. It is to be understood that the invention is applicable to many types of cream separators, and that it is not limited to the particular one shown herein. I have shown the well known series of separating cones 10, the upper dividing cone 11 of which forms the wall which separates the cream from the milk in the ordinary use of it as a cream separator. Down through the center is the inlet tube 12 of the usual construction, and these parts are mounted in the hood 13 operating in the casing 14, as is well understood. The machine receives the milk from the receptacle 15 at the top down through the inlet tube and by centrifugal force ordinarily throws the heavier separated milk out to the edges of the cones and up over the surface of the dividing cone 11, while the cream, being lighter, moves up the central parts of the device.

The parts so far described are not modified in any way to secure the objects of this invention, but I provide means for restricting the outflow of milk to such an extent as to force the main body of milk to flow out the upper outlet. This I have shown in the form of a collar 16 which has an outlet 17 somewhat larger than the usual cream outlet. It is provided with a waste outlet 18 at the bottom which is in the form of one or more very fine holes. This registers with and restricts the usual milk outlet 23 which is partly filled by a projection 24 on the upper part of the dividing cone 11. The cone is also provided with a perforation 19 for letting the main body of milk in from the space around the outside of the inlet tube 12 and out the opening 17. This collar is held in position by the usual nut 22.

In the operation of the device, the parts being set up in the usual way and the rotary parts rotated as usual, it is found of course that the cream comes up in the direction of the arrows at the center and through the opening 19 and the outlet 17 in the usual way. No change is made in this part of the operation.

The milk however, which comes up outside the dividing cone 11 is forced to rise by the centrifugal force and the pressure of the liquid behind it and only a very small portion can escape through the minute perforation or perforations 18. After it does escape it passes into the waste outlet nozzle 20, but it constitutes a very small proportion of the milk. I find in practice that it is the very poorest part of the milk, being practically pure water. I also find in addition that it contains about seventy-five per cent of all the bacteria in the entire body of the milk. It is a waste product. The great body of the milk tends to pass up to these outlets 18 but cannot find passage through them so the richer milk behind it never moves up into this region at all, but the pressure of the incoming milk behind forces the richer milk, located between the cones, back so that it mingles with the cream and is discharged through the ports 19 and 17 into the cream nozzle 21. From what has been said it will be seen that the product which comes from the nozzle 21 is milk from which a very small proportion of the poorest ingredients has been removed so that it is somewhat enriched. The size of the passages 18 is so gauged that the enrichment will be sufficient to cause Holstein milk as it comes from the cow to pass the ordinary State regulations.

It will be seen in addition that this great mass of the milk and cream, containing perhaps 83% of all that was put into the separator, contains only about one quarter the bacteria, because as stated, the other three quarters goes out with the poor quality of milk through the nozzle 20. In this way I am enabled to enrich milk of the above mentioned kind for the purpose specified and also to increase its purity.

I am aware of the fact also that many modifications can be made in this invention and that it can be applied to other types of cream separators and milk graders without departing from the scope of the invention as expressed in the claims. Therefore I do not wish to be limited in these respects, but what I do claim is:

1. A centrifugal machine for enriching milk, provided with a hood for receiving the heavier elements of the milk and having a minute waste outlet through the wall of its neck and a relatively large outlet above it, whereby only a very small quantity of the poorest quality of milk will escape through the waste outlet and an enriched milk will be discharged through the second outlet.

2. A centrifugal machine of the character described having a collar provided with a minute outlet of constant area and a relatively large outlet in the same wall, said collar preventing most of the milk from being discharged and forcing it to flow back and enter the large outlet.

3. A centrifugal machine of the character described having a dividing cone with a passage behind and within the cone for the rising current of milk, said cone having a passage through its wall near the top to allow the milk to escape to the outside of said cone, the machine having a passage outside the cone for waste heavier than the milk, a collar at the top of the cone having a minute lower outlet for waste and a large upper outlet for milk registering with the milk passage at the top of the cone.

In testimony whereof I have hereunto affixed my signature.

ARTHUR S. NICKERSON.